Oct. 13, 1925.
W. H. KADESCH
UNIVERSAL JOINT
Filed Aug. 9, 1924
1,556,840
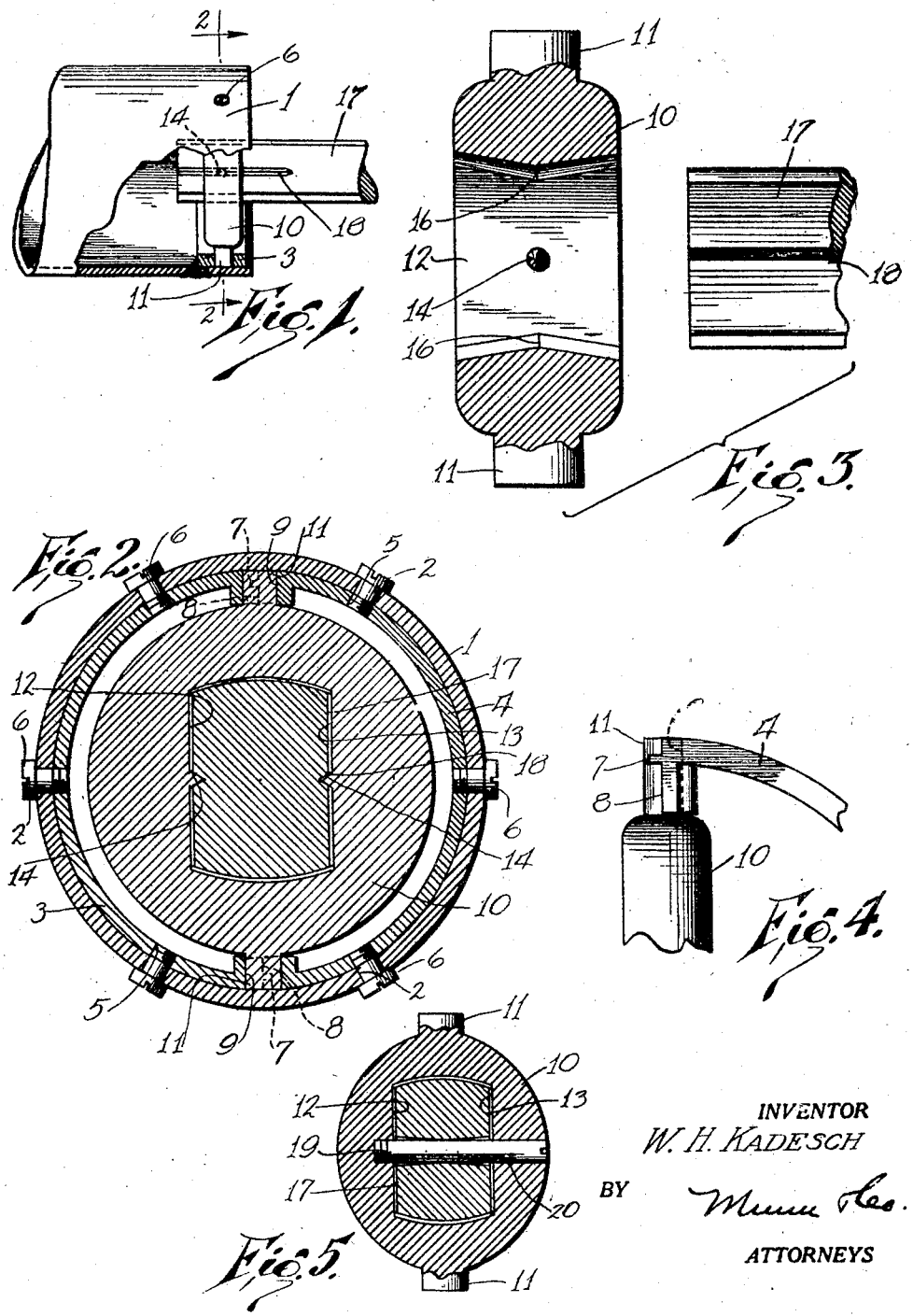
INVENTOR
W. H. KADESCH
BY
ATTORNEYS Patented Oct. 13, 1925.

1,556,840

UNITED STATES PATENT OFFICE.

WILLIAM H. KADESCH, OF CEDAR FALLS, IOWA.

UNIVERSAL JOINT.

Application filed August 9, 1924. Serial No. 731,168.

*To all whom it may concern:*

Be it known that I, WILLIAM H. KADESCH, a citizen of the United States, and a resident of Cedar Falls, Blackhawk County, Iowa, have invented a new and useful Improvement in Universal Joints, of which the following is a full, clear, and exact description.

My invention relates to improvements in universal joints, and it consists in the combinations, constructions, and arrangements herein described and claimed.

An object of my invention is to provide a universal joint of the type described which is particularly well adapted for use in the transmission of power where exceedingly heavy strain is apt to be placed upon the joint.

A further object of my invention is to provide a universal joint of the type described in which but one pair of diametrically opposed trunnions is employed, thereby greatly decreasing the possibility of breakage at the trunnions which is admittedly the weakest point of a universal joint. This is accomplished by the provision of a novel mechanism for engaging one of the shafts with the trunnion supported member of the joint in such a way as to cause the shaft to turn with this member.

A further object of my invention is to provide a device of the type described which may be readily disassembled for inspection and repair where necessary.

A further object of my invention is to provide a device of the type described that is simple in form, is extremely durable, and is thoroughly practical for the purpose intended.

Other objects and advantages will appear in the following specification, and the novel features of the invention will be particularly pointed out in the appended claims.

My invention is illustrated in the accompanying drawings, forming part of this application, in which—

Figure 1 is a side elevation of an embodiment of my invention, a part thereof broken away, Figure 2 is an enlarged sectional view along the line 2—2 of Figure 1, Figure 3 is a sectional view through a portion of the mechanism illustrated in Figure 2, Figure 4 is a front elevation of a part of the device shown in Figure 2, and Figure 5 is a sectional view of a modified form of my invention.

In carrying out my invention I make use of a tubular shaft 1 which may be either a drive shaft or a driven shaft. In this particular case we will assume and describe the shaft as a drive shaft. This tubular shaft 1 has a plurality of spaced apart openings 2 therethrough adjacent to the open end thereof.

A bearing ring consisting of a pair of segmental members 3 and 4 substantially semi-circular in contour and each having threaded openings 5 therethrough is secured to the innermost wall of the tubular member 1 by the provision of heavy machine screws 6 projected through the openings 2 and into the threaded openings 5 of the segmental members.

From inspection of Figure 4 it will be noted that the adjacent and contacting ends of the segmental members 3 and 4 are arranged to interlock with one another by the provision of lugs 7 on one end and recesses 8 at the opposite end.

Each of the adjacent ends of the segmental members 3 and 4 is provided with registering recesses 9 which when the members are disposed in the position shown in Figure 2 provide aligned bearings.

A substantially elliptical member 10 having opposed trunnions 11 extending radially therefrom is rotatably mounted by means of the trunnions 11 in the bearings formed by the registering recesses 9 so that the member 10 is free to rotate relative to the shaft 1.

The member 10 has an opening 12 substantially rectangular in cross section therethrough, having its axis transverse to the axis of the aligned trunnions 11. The side walls 13 of the opening 12 are substantially parallel and flat and are each provided with a substantially conical projection 14 which lie in registration with one another and which are in a plane common to the axis of the trunnions 11.

The opening 12, as reference to Figure 3 will indicate, is constricted at the mid portion 16 thereof and gradually widens toward the front and rear walls of the member. This constriction of the opening 12 occurs only at the top and lower walls of the opening and not the side walls 13.

A shaft 17 which I shall hereinafter refer to as the driven shaft is provided with a sectional contour adjacent its outermost end corresponding to the contour of the opening 12 at its mid point, i. e., in that plane common to the axis of the trunnions 11. This shaft 17, (see Figure 3) is provided with a pair of substantially V-shaped grooves 18 on opposite sides thereof for the introduction of the conical members 14 when the shaft 17 is projected through the opening 12. It will thus be seen that the shaft 17 may oscillate vertically relative to the member 10 when the device is in the position shown in Figures 2 and 3. In other words, the shaft 17 may oscillate in a plane transverse to the oscillatory path of the member 10 on its bearing members 3—4. This arrangement provides a perfect universal joint in which all possibility of rotation of the shaft 17 relative to the member 10 is precluded.

From the foregoing description of the various parts of the device, the operation thereof may be readily understood. In use my improved universal joint operates to transmit power from one shaft to another such as the shaft 1 to the shaft 17, whether the shafts be in axial alignment with one another or not, substantially in the manner of the ordinary type of universal joint.

With my improved joint, however, longitudinal movement of the shaft 17 relative to the shaft 1 may be accomplished without in any way disturbing the effective engagement of the shafts with each other, or without in any way weakening the universal joint for connecting the shafts. This is due to the fact that the shaft 17 is provided with grooves 18 which partially encompass the conical projections 14 and which may thus move longitudinally relative to the conical projection, but may not move laterally aside from oscillation upon the conical members as a fulcrum.

Another and most important advantage which is obtained by the provision of my improved universal joint is that all possibility of the disengagement of the shaft 17 with the member 10 as to rotation therewith is precluded.

In Figure 5 I have shown a modified form of my invention in which in place of employing a pair of diametrically opposed projections 14 I employ a bolt 19 which is projected through an opening 20 in the shaft 17. In this form of the invention, the shaft 17 may not move longitudinally relative to the member 10 but may only oscillate vertically or transverse to the oscillatory path of the member 10.

In order that friction may be reduced to a minimum between the shaft 17 and the bolt 19, and to prevent shearing of the bolt, the opening 20 through the shaft 17 is constricted at its mid point so as to provide a minimum bearing surface between the shaft and bolt.

I claim:

1. A universal joint of the character described comprising a substantially annular member having an elongated opening therethrough, trunnions carried on said member, having their axes transverse to the axis of said opening, means for rotatably mounting said member upon a shaft, and a second shaft having a cross sectional contour adjacent its outer end, corresponding to the contour of said elongated opening, said shaft being projected through said opening, whereby rotation of the first named shaft would cause rotation of the second named shaft, and means associated with said member and said second named shaft for confining lateral movement of said shaft in said opening, said means comprising projections, diametrically opposed, extending inwardly from the side walls of said opening through said member in grooves provided in the side walls of said shaft extending longitudinally of said shaft.

2. A universal joint of the character described comprising a substantially annular member having an elongated opening therethrough, trunnions carried on said member, having their axes transverse to the axis of said opening, means for rotatably mounting said member upon a shaft, and a second shaft having a cross sectional contour adjacent its outer end, corresponding to the contour of said elongated opening, said shaft being projected through said opening, whereby rotation of the first named shaft would cause rotation of the second named shaft, and means associated with said member and said second named shaft for confining lateral movement of said shaft in said opening, said means comprising conical projections diametrically opposed, extending inwardly from the side walls of said opening through said member in V shaped grooves provided in the side walls of said shaft extending longitudinally of said shaft.

3. A universal joint of the character described comprising a tubular shaft, a substantially annular member having an elongated opening therethrough, trunnions carried on said member having their axes transverse to the axis of said opening, an annular member arranged to be fixed to the inner wall of said tubular shaft, said member being split into two cooperating parts at diametrically opposite points and being provided with cooperating bearing members at their places of union with one another for the reception of said trunnions on said substantially annular member, and a second shaft having a cross sectional contour corresponding to the contour of said elongated opening adjacent to its outer end, said last named shaft being projected through said opening whereby rotation of the first named shaft will cause rotation of the second named shaft, and means associated with said substantially annular member and with said second named shaft for confining lateral movement of said shaft in said opening.

4. A universal joint of the character described comprising a tubular shaft, a substantially annular member having an elongated opening therethrough, trunnions carried on said member having their axes transverse to the axis of said opening, an annular member arranged to be fixed to the inner wall of said tubular shaft, said member being split into two cooperating parts at diametrically opposite points and being provided with cooperating bearing members at their places of union with one another for the reception of said trunnions on said substantially annular member, and a second shaft having a cross sectional contour corresponding to the contour of said elongated opening adjacent to its outer end, said last named shaft being projected through said opening whereby rotation of the first named shaft will cause rotation of the second named shaft, and means associated with said substantially annular member and with said second named shaft for confining lateral movement of said shaft in said opening, said means comprising diametrically opposed projections extending inwardly from the side walls of the opening through said substantially annular member, and in grooves provided in the side walls of said second named shaft, said grooves extending longitudinally of said shaft.

WILLIAM H. KADESCH.